United States Patent
Tsunoda et al.

(10) Patent No.: US 6,788,341 B2
(45) Date of Patent: Sep. 7, 2004

(54) DATA RECORDING APPARATUS

(75) Inventors: Hiroshi Tsunoda, Kadoma (JP); Akira Toba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 783 days.

(21) Appl. No.: 09/734,728

(22) Filed: Dec. 13, 2000

(65) Prior Publication Data

US 2001/0005223 A1 Jun. 28, 2001

(30) Foreign Application Priority Data

Dec. 14, 1999 (JP) .......................................... 11-354483

(51) Int. Cl.$^7$ .............................................. H04N 5/262
(52) U.S. Cl. ................................ 348/231.1; 348/231.7; 360/133
(58) Field of Search ....................... 348/207.99, 231.99, 348/231.1, 231.2, 231.3, 231.6, 231.7, 231.8, 231.9; 386/125, 126, 45; 360/132, 133, 135, 72.2; 371/2.1, 40.14; 714/701

(56) References Cited

U.S. PATENT DOCUMENTS

| | | | |
|---|---|---|---|
| 4,723,181 A | * | 2/1988 | Hickok ...................... 360/72.2 |
| 4,814,924 A | * | 3/1989 | Ozeki ......................... 360/133 |
| 5,170,262 A | * | 12/1992 | Kinoshita et al. ........... 386/118 |
| 5,732,088 A | * | 3/1998 | Sako .......................... 714/701 |

FOREIGN PATENT DOCUMENTS

| | | | | |
|---|---|---|---|---|
| EP | 0265167 A2 | * | 4/1988 | ........... G11B/27/00 |
| JP | 04-181583 | | 6/1992 | |
| JP | 10-145717 | | 5/1998 | |
| JP | 10-149650 | * | 6/1998 | ........... G11B/23/03 |

\* cited by examiner

*Primary Examiner*—Tuan Ho
(74) *Attorney, Agent, or Firm*—Westerman, Hattori, Daniels & Adrian, LLP (57) ABSTRACT

A data recording apparatus includes a slot for receiving a memory card having a disk, a flash memory and a controller. Each time one frame of compressed image data is recorded to the disk, a vacant capacity value of the disk is written to the flash memory. This vacant capacity value is read out according to an instruction given from a CPU. When the vacant capacity of the disk is lower than the vacant capacity of a compressed image area formed in an SDRAM, the CPU invalidates the vacant capacity of the compressed image area in a portion exceeding the vacant capacity of the disk. This restricts the number of frames to be picture-taken.

9 Claims, 7 Drawing Sheets

DATA RECORDING APPARATUS

BACKGROUND OF THE INVENTION

1. Field of the Invention

This invention relates generally to data recording apparatuses and, more particularly, to a data recording apparatus, which is applied for digital cameras, audio recorders or the like, for recording external data into a removable recording medium.

2. Description of the Prior Art

In order to record data to such a recording medium as an optical disk, there is a need to first rotate the optical disk. A recordable state is first available after the rotation velocity of the disk has stabilized. Consequently, when using a disk as a recording medium, it takes longer in getting a recordable state after turning on a power as compared to the case using a semiconductor memory as a recording medium.

Consequently, in the conventional digital camera using a disk recording medium, even if the power is turned on, the shutter button is not allowed to operate before the disk rotation velocity has stabilized. If herein a photographic image is temporarily stored to a semiconductor memory of the digital camera, shutter-button operation is possible even before stabilization in rotational velocity. However, recording to the disk must be assured for a photographic image once stored within the semiconductor memory through operation of the shutter button. In other words, in a state that a vacant capacity of the disk is less than a vacant capacity of the semiconductor memory, the shutter button should not be activated for operation. That is, whether to activate the shutter-button or not must be determined based upon a vacant capacity of the disk. In conclusion, the shutter button has been impossible to operate before disk rotation velocity has stabilized followed by reading a vacant capacity out of the disk.

Meanwhile, in the prior art it takes long in indicating the number of recordable frames, because the number of recordable frames is to be first calculated after detecting a vacant capacity.

SUMMARY OF THE INVENTION

Therefore, it is an primary object of the present invention to provide a data recording apparatus which can commence to fetch data even before a recordable state becomes available.

Another object of the invention is to provide a data recording apparatus which can output information related to a vacant capacity immediately after turning on a power.

According to the present invention, a data recording apparatus having a slot for receiving therein a removable recording medium including a first semiconductor memory and a disk, to record data fetched by a fetcher and temporarily stored in a second semiconductor memory to the disk, comprises: a vacant capacity value writer for writing a first vacant capacity value of the disk to the first semiconductor memory after the data have been recorded; a vacant capacity value reader for reading the first vacant capacity value out of the first semiconductor memory when turning on a power; and a restricter for restricting an amount of data to be fetched by the fetcher on the basis of the first vacant capacity value read out by the vacant capacity value reader.

The data fetched by the fetcher, after temporarily stored in the second semiconductor memory, is recorded on a disk included within the recording medium received in the slot. Herein, the vacant capacity writer writes a first capacity value of the disk to the first semiconductor memory included in the recording medium after the data has been recorded. The vacant capacity value written in the first semiconductor memory is read out by the vacant capacity reader in response to turning on the power in the next time. The amount of data to be fetched by the fetcher is restricted based on the first vacant capacity value by the restricter. Consequently, data fetching can be commenced even before a recordable state becomes available.

The restricter preferably includes a comparator to compare a second vacant value of the second semiconductor memory with the first vacant capacity value, and an invalidator for making invalid the second semiconductor memory in a portion exceeding the first vacant capacity value depending upon a result of comparison by the comparator.

In a preferred embodiment of the invention, a starter starts up the disk after turning on the power. A determiner determines whether or not the disk has stabilized in rotation velocity. After the rotation velocity has stabilized, a recorder records the data stored on the second semiconductor memory to the disk.

In another preferred embodiment of the invention, the fetcher includes a picture-taker to take a picture of a subject and a compressor to compress image data taken by the picture-taker. The second semiconductor memory stores image data compressed by the compressor. In a further preferred embodiment, a number-of-recordable-frames calculator calculates the number of recordable frames on the basis of the first vacant capacity value read out by the vacant capacity value reader. An indicator indicates the number of recordable frames.

In still another embodiment of the invention, a marker writer writes a predetermined marker to the first semiconductor memory after the data have been recorded. A marker determiner determines whether or not the predetermined marker exists on the first semiconductor memory when the power is turned on. A disabler disables the fetcher for a predetermined time depending upon a result of determination by the marker determiner. Herein, the predetermined time is a time for which the disk comes into stabilization in rotation velocity.

According to the present invention, a data recording apparatus having a slot for receiving therein a removable recording medium including a semiconductor memory and a disk, to record data fetched by a fetcher to the disk, comprises: a vacant capacity value writer to write a vacant capacity value of the disk to the semiconductor memory after the data have been recorded; a vacant capacity value reader to read the vacant capacity value out of the semiconductor memory when a power is turned on; and an outputter to output information related to the vacant capacity value read out by the reader.

The data fetched by the fetcher is recorded to the disk included within the recording medium received in the slot. Completing the recording, a vacant capacity value is written to the semiconductor memory by the vacant capacity value writer. The vacant capacity value reader reads a vacant capacity value from the semiconductor memory in response to turning on the power in the next time. The outputter outputs information related to the read vacant capacity value. Consequently, it is possible to output information related to a vacant capacity value immediately after turning on the power.

In a preferred embodiment of the invention, the fetcher includes a picture-taker to take a picture of a subject, the outputter including a calculator to calculate the number of recordable frames on the basis of the vacant capacity value, and an indicator to indicate the number of recordable frames.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
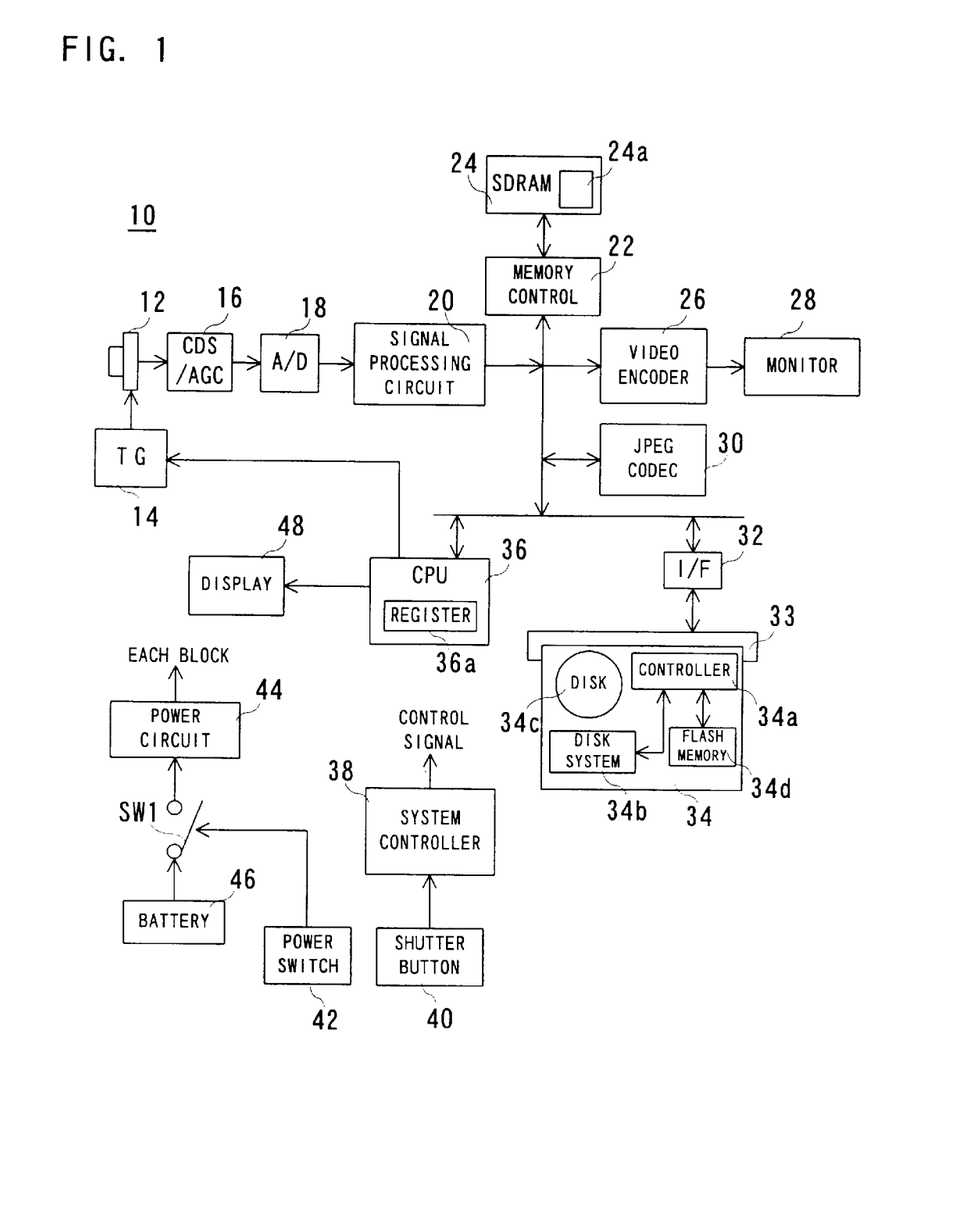
FIG. 1 is a block diagram showing a configuration of one embodiment of the present invention.

Referring to FIG. 1, a digital camera 10 of this embodiment includes a power switch 42. When an operator turns the power switch 42 to an on state, a switch SW1 is interactively turned on and a battery 46 is put into connection to a power circuit 44. The power circuit 44 outputs a power voltage based on a battery voltage, thereby starting up the digital camera 10 and the memory card 34 inserted in a slot 33.

Supplied with a power voltage, the system controller 38 instructs a CPU 36 to perform a through-image display process. In response to the through-image display instruction, the CPU 36 instructs a timing generator (TG) 14 to perform thinning-out reading. The TG 14 drives a CCD imager 12 by a thinning-out reading scheme. Due to this, a low-resolution camera signal (pixel signal) corresponding to a subject image illuminated to a light-receiving surface is outputted from the CCD imager 12. The output camera signal is subjected to well-known noise removal and level adjustment in a CDS/AGC circuit 16 and then converted into a digital signal by an A/D converter 18.

When instructed for a through-image display process, the CPU 36 sends a process command to a signal processing circuit 20. The signal processing circuit 20 performs processes including color separation and YUV conversion on the camera data outputted from the A/D converter 18, and requests a memory control circuit 22 to write YUV data thus produced. In response to the write request, the memory control circuit 22 temporarily stores the YUV data in an SDRAM 24. The CPU 36 sends a process command also to a video encoder 26. The video encoder 26 requests the memory control circuit 22 to read out YUV data and performs an encode process on the YUV data read cut of the SDRAM 24. The YUV data is converted into a composite image signal, and the converted composite image signal is outputted onto a monitor 28. On the monitor 28, displayed is a real-time motion image (through-image) of the subject.

When the operator presses the shutter button 40, the system controller 38 instructs the CPU 36 to perform a record process. Thereupon, the CPU 36 instructs the TG 14 to perform all-pixel reading. In response to this instruction, the TG 14 drives the CCD imager 12 by the all-pixel-reading scheme. As a result, a high-resolution camera signal (1-framed camera signal) corresponding to the subject image at a time of pressing the shutter button 40 is outputted from the CCD imager 12.

The CPU 36, when instructed for a record process, also sends a process command to the signal processing circuit 20 and the video encoder 26. Consequently, the camera signal outputted from the CCD imager 12 is processed in a manner similar to the above. That is, YUV data is produced based on the camera signal, and the produced YUV data is stored in the SDRAM 24. The video encoder 26 reads YUV data out of the SDRAM 24 and converts the read YUV data into a composite image signal. As a result, a still image (freeze image) of the subject is displayed on the monitor 28.

The CPU 36 also provides a compression command to a JPEG CODEC 30. In response to the compression command, the JPEG CODEC 30 requests the memory control circuit 22 to read out YUV data. In response to the read request, the memory control circuit 22 reads YUV data, i.e. subject still image data, out of the SDRAM 24 and provides it to the JPEG CODEC 30. The still image data is compressed according to the JPEG format. After producing compressed image data (JPEG data), the JPEG CODEC 30 provides the compressed image data, together with a write request, to the memory control circuit 22. Due to this, the compressed image data is also stored in the SDRAM 24. The compressed image data concretely is stored in a compressed image area 24a.

After the disk (optical disk) 34c arranged within the memory card 34 has stabilized in operation, the CPU 36 requests the memory control circuit 22 to read out the compressed image data stored in the compressed image area 24a. The compressed image data read out by the memory control circuit 22 is provided to a controller 34a in the memory card 34 through an I/F circuit 32. The controller 34a records the compressed image data to the disk 34c by controlling a disk system 34b. After completing the recording, the system controller 38 instructs the CPU 36 to perform a through-image display process. As a result, a through-image process as mentioned above is again executed thereby displaying a through-image on the monitor 28.

Figure 2:
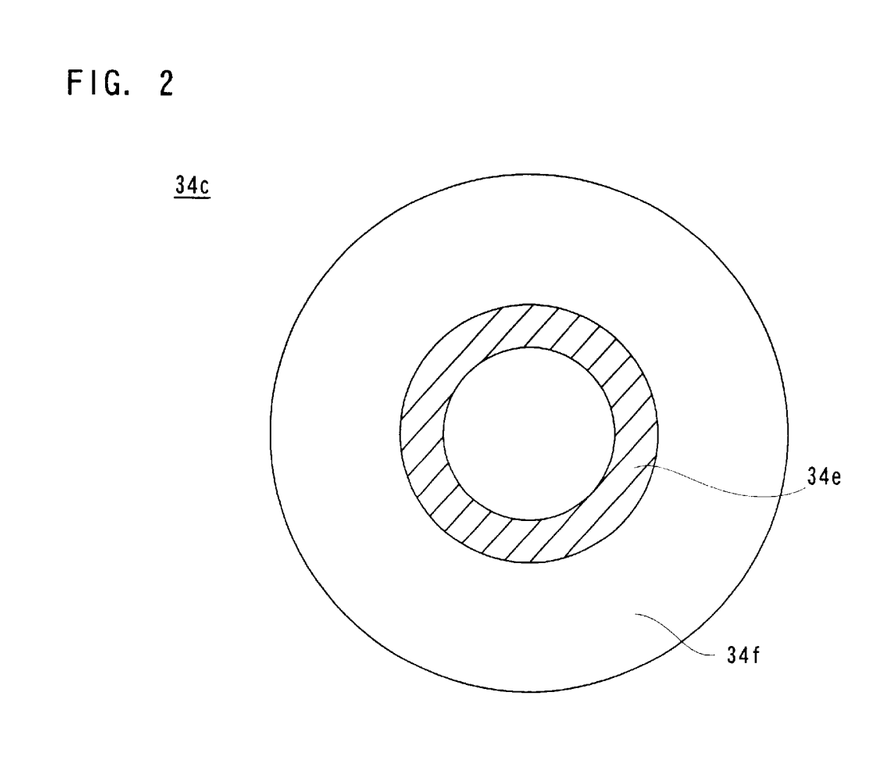
FIG. 2 is an illustrative view showing a structure of a disk provided within a memory card.

Explaining in greater detail the memory card 34 inserted in the slot 33, the disk system 34b includes a spindle motor and an optical pickup (both not shown). On the disk 34c, a management zone 34e and a data zone 34f are formed as shown in FIG. 2. Compressed image data is written onto the data zone 34f. The management zone 34e is a region for managing as to how and what data is recorded in the data zone 34f, and written with a vacant capacity value of the data zone 34f in addition to compressed image data identifiers, data amounts and head addresses.

Figure 3:
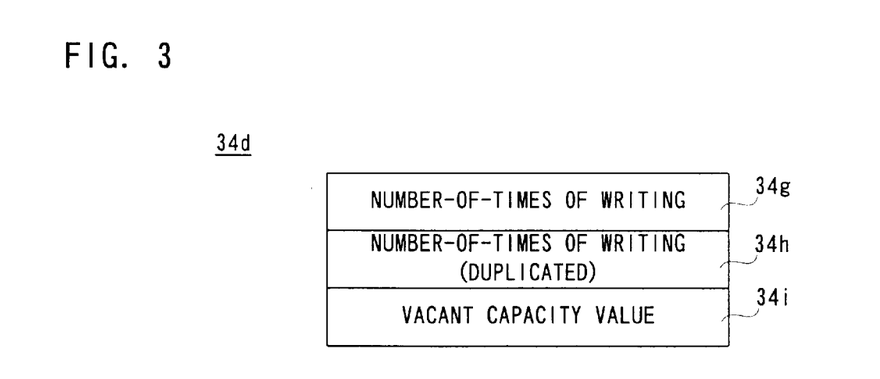
FIG. 3 is an illustrative view showing a configuration of a flash memory provided within the memory card.

On the flash memory 34d, storage areas 34g–34i are formed as shown in FIG. 3. The storage area 34g stores number-of-times-of-writing data. This data is incremented each time predetermined bytes of the compressed image data is written to the data zone 34f of the disk 34c. The storage area 34h stores a duplication of the number-of-times-of-writing data of the storage area 34g. However, the duplication process is performed at a time that all the compressed image data secured in the compressed image area 24a of the SDRAM 24 has been written to the data zone 34f. The storage area 34i is to be written by a vacant capacity value of the data zone 34f. That is, the vacant capacity value is to be written not only to the management zone 34e but also to the storage area 34i. Writing of a vacant capacity value to the storage area 34i is also made when all the compressed image data secured in the compressed image area 24a has been written to the data zone 34f.

Figure 4:
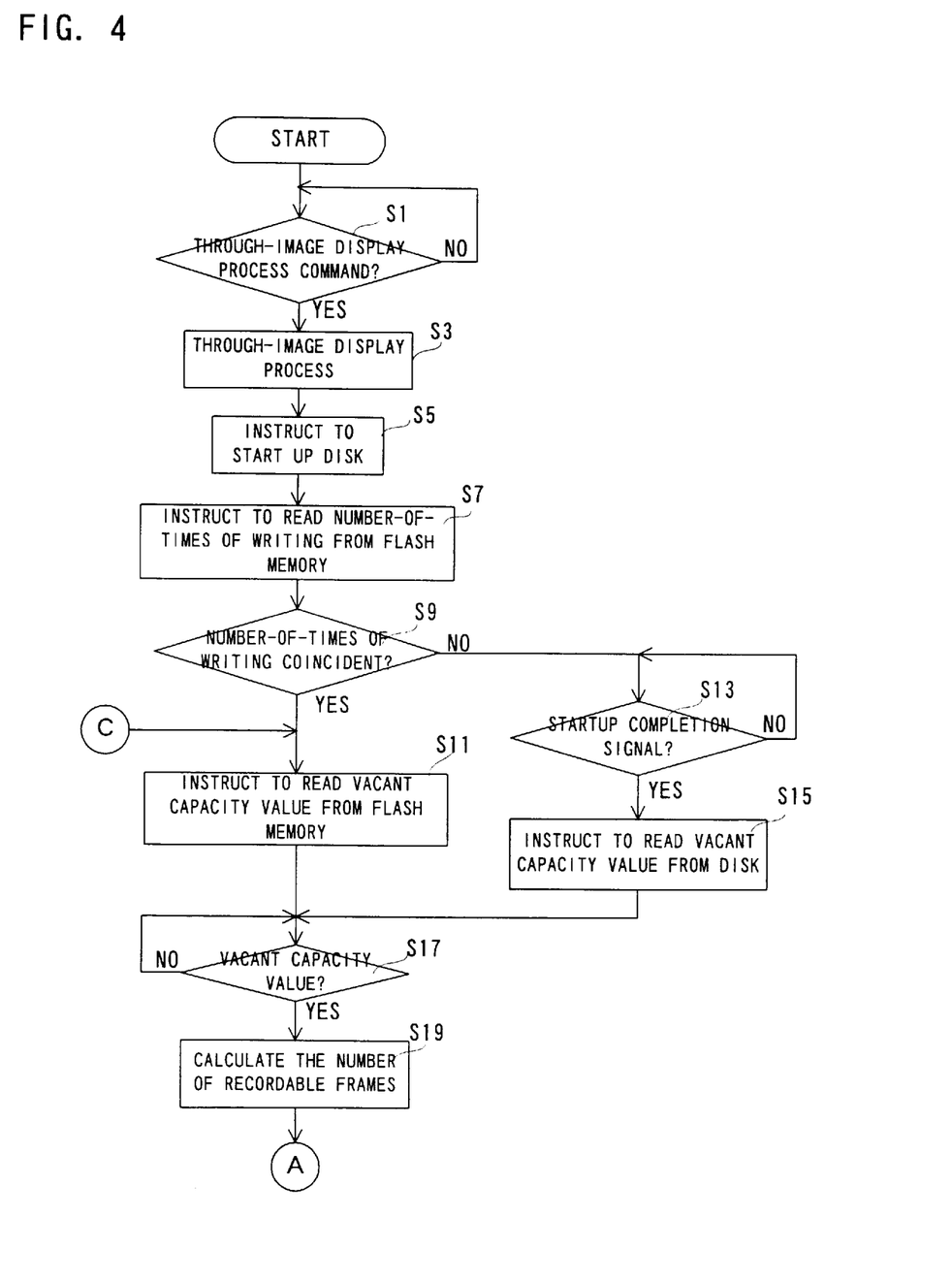
FIG. 4 is a flowchart showing part of operation of a CPU provided in the digital camera.
Figure 5:
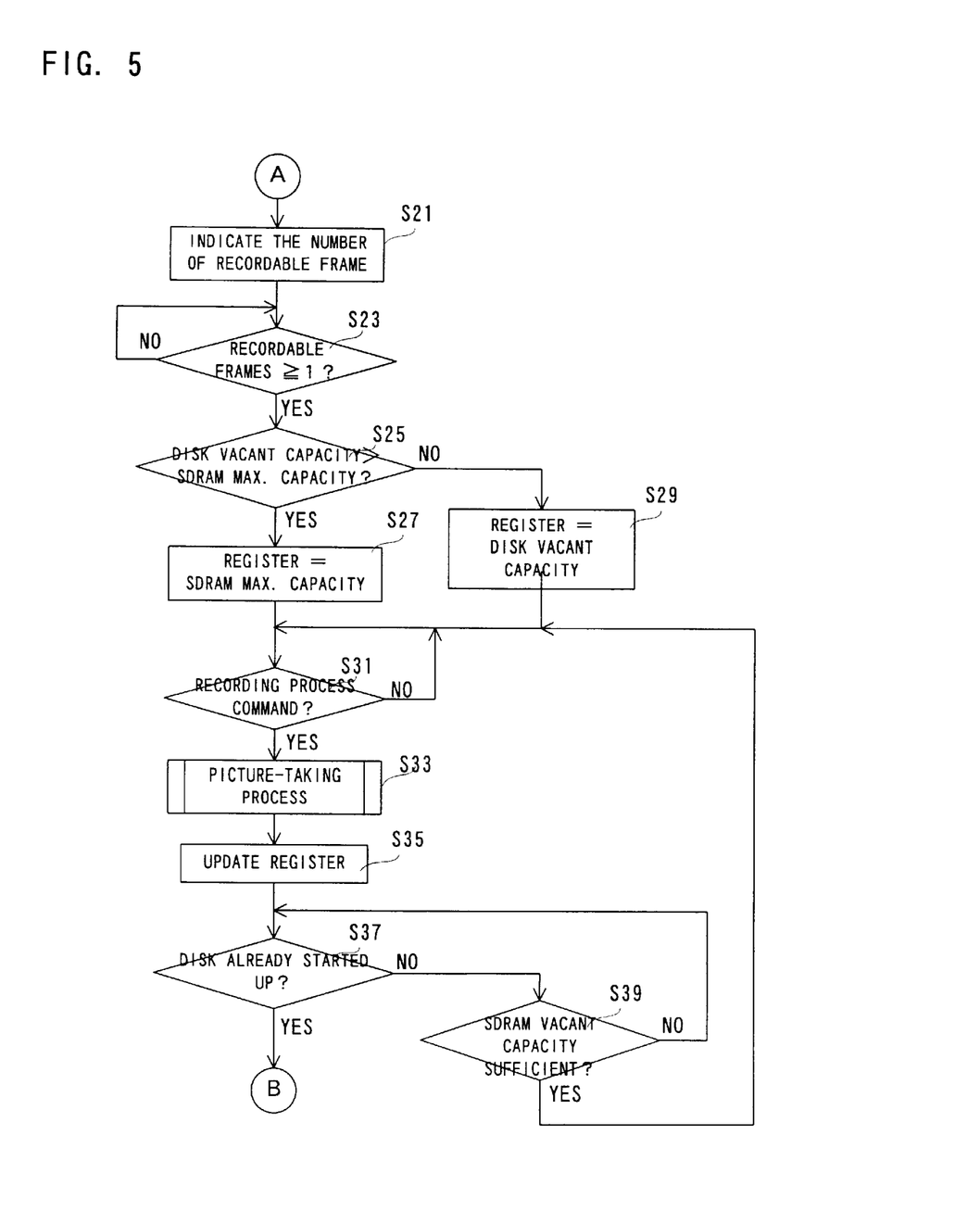
FIG. 5 is a flowchart showing another part of operation of the CPU provided in the digital camera.
Figure 6:
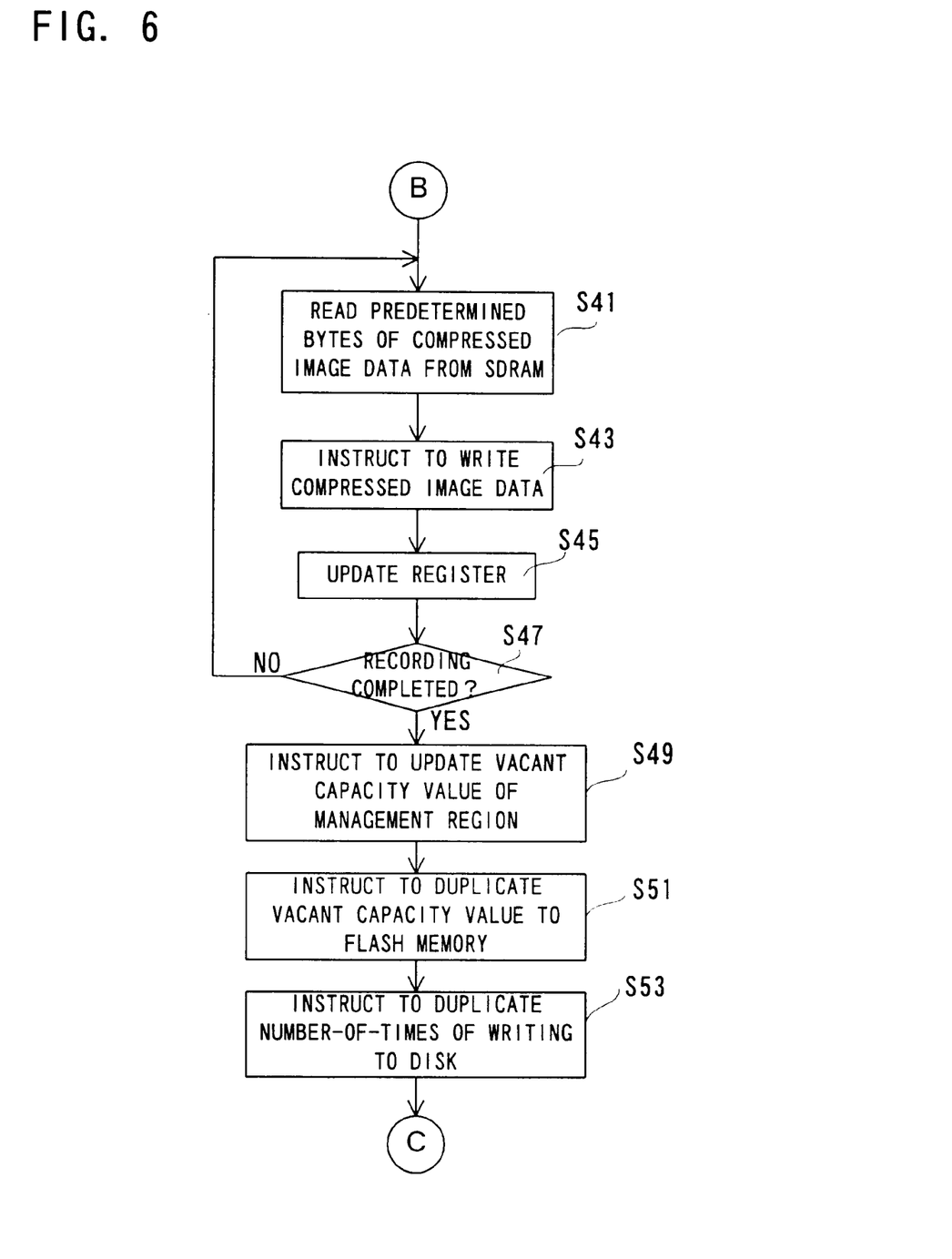
FIG. 6 is a flowchart showing still another part of operation of the CPU provided in the digital camera.
Figure 7:
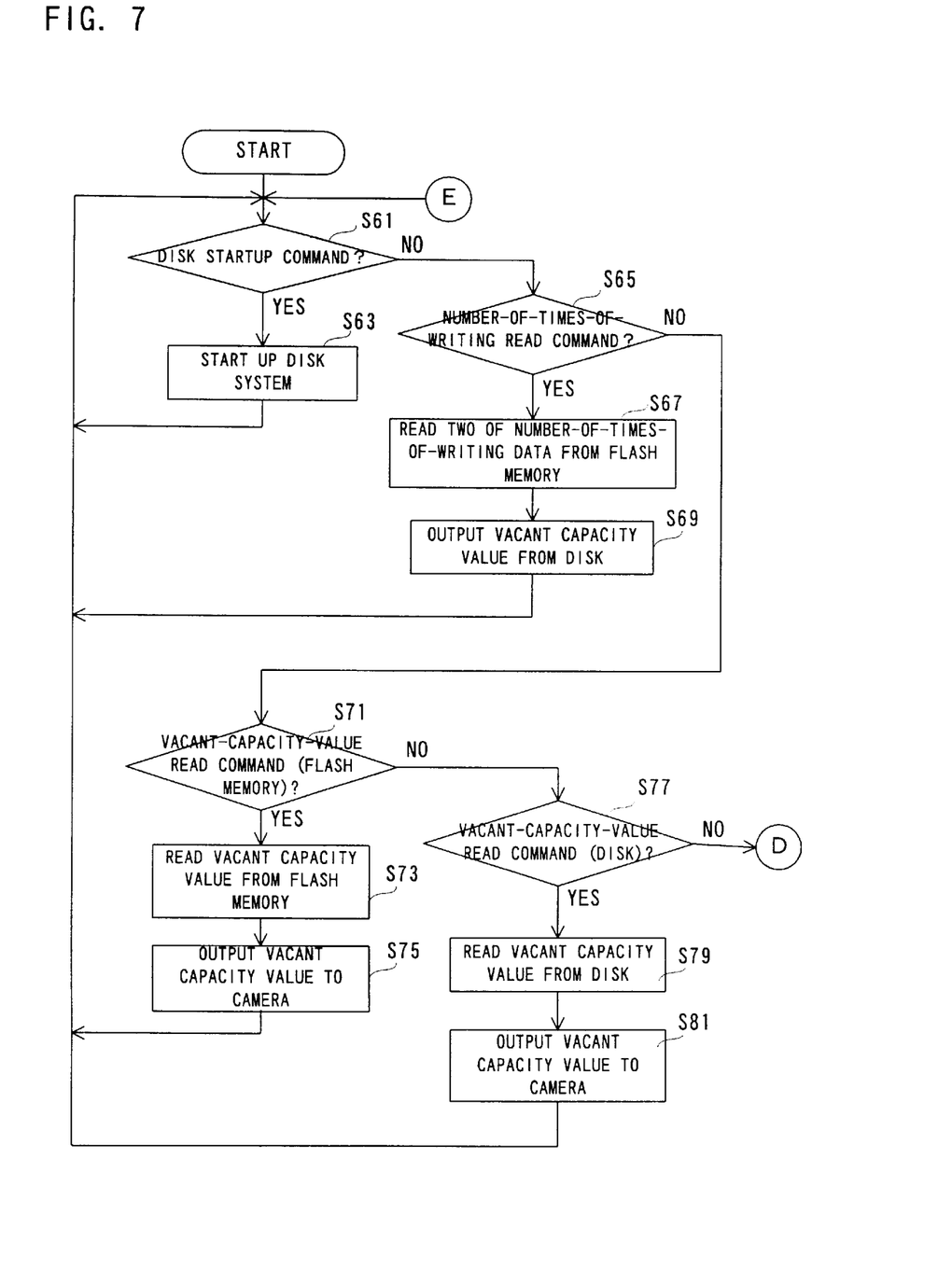
FIG. 7 is a flowchart showing part of operation of a controller provided within the memory card.
Figure 8:
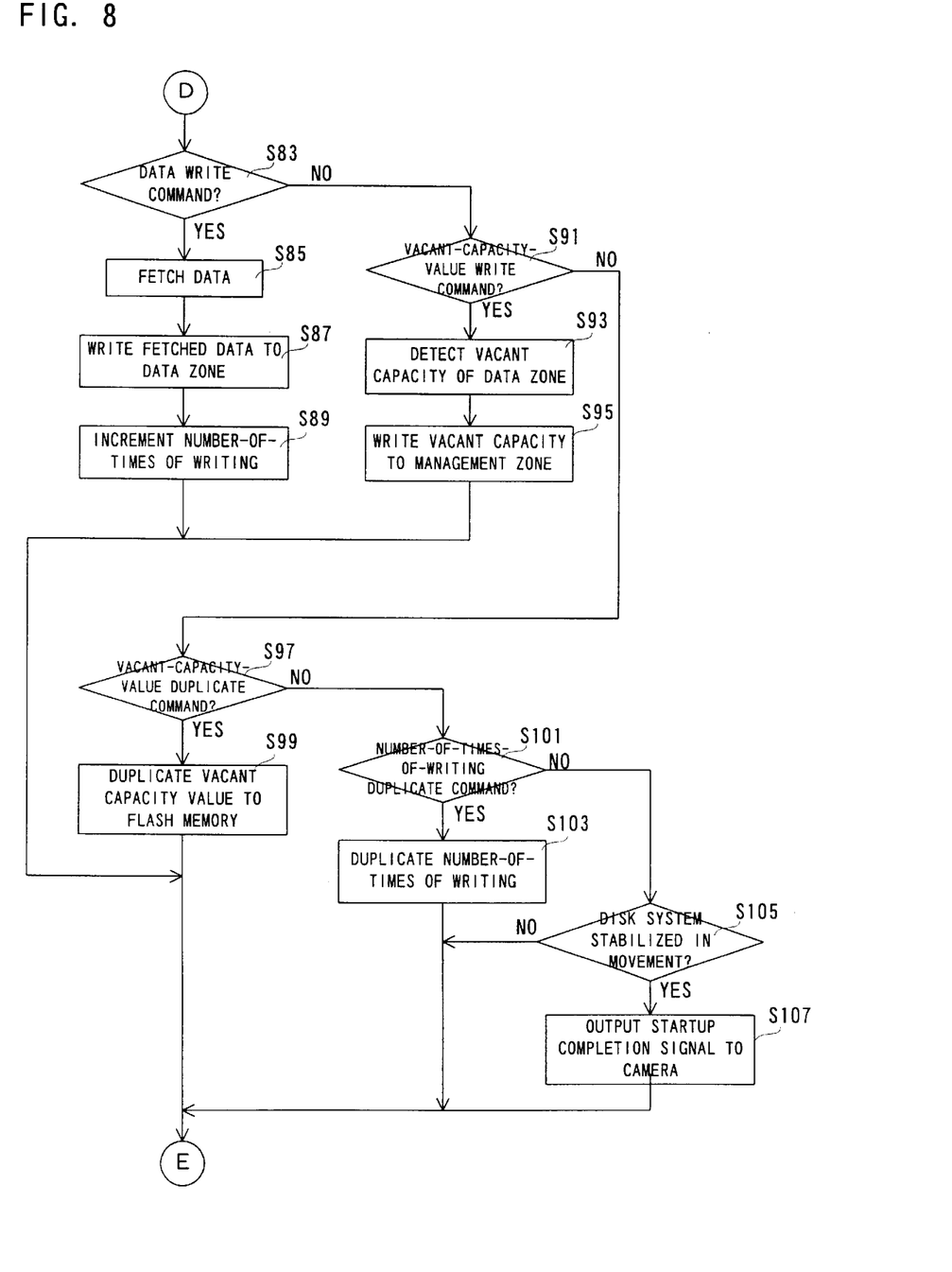
FIG. 8 is a flowchart showing another part of operation of the controller provided within the memory card.

In the camera mode, the CPU 36 concretely processes a flowchart shown in FIG. 4 to FIG. 6, while the controller 34a concretely processes a flowchart of FIG. 7 and FIG. 8. Incidentally, both the CPU 36 and the controller 34a commence the process in response to turning on the power (turning on of the power switch 44).

Referring first to FIG. 4, the CPU 36 determines, in step S1, a presence or absence of a through-image display process command. When this process command is given, a through-image display process is made in step S3. That is, the TG 14 is instructed to perform thinning-out reading, and the signal processing circuit 20 and video encoder 26 is given a predetermined processing command. As a result, the though-image of a subject is displayed on the monitor 28.

In the succeeding steps S5 and S7, a disk startup command and number-of-times-of-writing-to-disk reading command is given to the controller 34a in the memory card 34. The controller 34a starts up the disk system 34b in response to the disk startup command. Also, the controller 34a reads out number-of-times-of-writing data out of the storage areas 34g and 34h of the flash memory 34d in response to the number-of-times-of-writing-to-disk reading command and sends back the read number-of-times-of-writing data to the CPU 36.

The CPU 36 compares between the two values of sent-back number-of-times-of-writing data in step S9. If the result of comparison shows coincidence, the CPU 36 in step S11 instructs the controller 34a to read a vacant capacity value out of the flash memory 34d. On the contrary, if the result of comparison shows non-coincidence, the CPU proceeds to step S15 to wait for sending back a startup completion signal from the controller 34a. When a startup completion signal is sent back, the CPU 36 in step S17 instructs the controller 34a to read a vacant capacity value out of the disk 34c.

The memory card 34 is a removable, general-purpose recording medium and may be received in such a camera that the process as in this embodiment is not made. In such a case, there is no assurance that a correct vacant capacity value is always stored in the storage area 34i of the flash memory 34d. Consequently, in this embodiment, two of number-of-times-of-writing data are read out of the flash memory 34 to determine the truth/false of a vacant capacity value stored in the storage area depending upon coincidence/non-coincidence between them. If the vacant capacity value of the storage area 34d is correct, the controller 34a is instructed in step S11 to read out the vacant capacity value. If the vacant capacity value of the storage area 34d is incorrect, the controller 34a is instructed in step S15 to read a vacant capacity value out of the management zone 34e. However, because reading from the management zone 34e is impossible to perform unless the disk 34c is completely started up, the process of the step S15 is executed in response to the return of a startup completion signal.

Incidentally, described later is the reason that the vacant capacity value is incorrect when two of number-of-times-of-writing are not coincident.

It is determined in step S17 whether a vacant capacity value is sent back from the controller 34a or not. If "YES", in step S19 the number of recordable frames is calculated from the vacant capacity value. Specifically, the sent-back vacant capacity value is divided by a size of the compressed image data to determine the number of recordable frames. The CPU 36 subsequently indicates, on the display 48, the calculated number of recordable frames and, in step S23, determines whether the number of recordable frames is equal to or greater than "1" or not. If the number of recordable frames herein is "1" or greater, the process proceeds to step S25 while, if the number of recordable frames is "0", the process of step S23 is repeated. Consequently, when the number of recordable frames is "0", the operation of the shutter button 40 is always rendered invalid so that a through-image is kept in display on the monitor 28.

When advancing to step S25, the CPU 36 compares the maximum capacity value of the compressed image area 24a with the vacant capacity value of the disk 34c. If the vacant capacity value is greater than the maximum capacity value, the maximum capacity value in step S27 is written to the register 36a. If the vacant capacity value is smaller than the maximum capacity value, the vacant capacity value in step S29 is written to the register 36a. The register 36a is a register to write an effective vacant capacity value of the compressed image area 24a. When the vacant capacity value of the disk 34c is smaller than the maximum capacity value of the compressed image area 24a, the capacity of the compressed image area 24a in a portion exceeding the vacant capacity of the disk 34c is made invalid.

Incidentally, the compressed image data at the time the step S25 is processed has not been stored in the compressed image area 24a so that the vacant capacity value of the compressed image area 24a is equal to the maximum capacity value. Consequently, in the step S25, the maximum capacity value of the compressed image area 24a is compared with a vacant capacity value of the disk 34c.

In step S31, it is determined whether a record processing command has been given from the system controller 38 or not, i.e. whether the shutter button 40 has been pressed or not by the operator. If a record processing command has been given, in step S33 a picture-taking process is executed. Specifically, the TG 14 is instructed to perform all-pixel reading, the signal processing circuit 20 and encoder 26 is instructed to process signals, and the JPEG CODEC 30 is instructed to perform a compression process. This outputs a high-resolution camera signal from the CCD imager 12, and the YUV data corresponding to the camera signal is produced by the signal processing circuit 20. Also, the produced YUV data is converted into a composite image signal by the video encoder 26, and the same YUV data is compressed by the JPEG CODEC 30. As a result, a freeze-image is displayed on the monitor 28 and the compressed image data is secured in the compressed image area 24a. The CPU 36 thereafter, in step S35, updates the vacant capacity of the compressed image area 24a. That is, the size of one-frame compressed image data is subtracted from the effective vacant capacity value stored in the register 36a.

Incidentally, the picture-taking process ends when the compressed image data has been secured to the compressed image data 24a. Recording of the compressed image data to the memory card 34 is made in the later step.

The CPU 34 subsequently, in step S37, determines whether the disk 34c has started up or not and, in step S39, determines whether the vacant capacity is left sufficient in the compressed image 24a or not. The determination of the step S39 is made on the basis of a vacant capacity value of the register 36*a*. If the disk 34*c* has not yet been started up and the vacant capacity of the compressed image area 24*a* is insufficient, the CPU 36 repeats the process of the steps S37 and S39. On the other hand, if the disk 34*c* has not been completely started up but the vacant capacity of the compressed image area 24*a* is sufficient, the process returns to the step S31. Consequently, each time the shutter button 40 is operated, compressed image data is stored to the compressed image area 24*a* thereby decreasing the vacant capacity value of the register 36*a*.

Incidentally, the determination of the step S37 is made based on a startup completion signal given from the controller 34*a*. That is, although "NO" is determined before startup completion signal has not been sent back, once a start up completion signal is sent back, "YES" is determined at all times from then on unless the power is not turned off.

The determination result of "YES" in the step S37 represents that the rotation velocity of the disk 3 is stabilized thus acquiring a recordable state. Consequently, the CPU 36 advances to step S41 according to a determination result "YES" where it requests the memory control circuit 22 to read predetermined bytes of compressed image data. Also, in step S43, the read predetermined byte compressed image data is outputted, together with a write command, to the controller 34*a*. The controller 34*a* records the predetermined bytes of compressed image data to the disk 34*c* in response to the write command. The controller 34*a* also updates the number-of-times-of-writing stored in the storage area 34*g* of the flash memory 34*d* each time predetermined bytes have been recorded. The CPU 36 thereafter, in step S45, updates the vacant capacity value of the register 36*a*. That is, the current vacant capacity value is added with the predetermined bytes.

In step S47, it is determined whether the compressed image data stored in the compressed image area 24*a* have been all recorded or not. If "NO", the process of the steps S41–S47 is repeated. On the other hand, if "YES", the process proceeds to step S49 where it instructs the controller 34*a* to update the vacant capacity value written on the disk 34*c*. The controller 34*a* updates the vacant capacity value of the management zone 34*e* in response to this instruction. The CPU 36 further, in step S51, instructs the controller 34*a* to duplicate the capacity value from the management zone 34*e* to the storage area 34*h*, and in step S53 instructs the controller 34*a* to duplicate the number-of-times-of-writing data from the storage area 34*g* to the storage area 34*h*. The controller 34*a* performs a duplication process of the vacant capacity value and number-of-times-of-writing data in response to these instructions. Completing the process of the step S53, the CPU 36 returns to the step S11.

The step S49 is a process of taking into considering the versatility of the memory card 34. By this process, even if there is an error in the vacant capacity value of the flash memory 34, it is possible to detect a correct vacant capacity value by access to the management zone 34*d*. The step S51 is a process for reading a vacant capacity value swiftly upon turning the power in the next time. By writing a vacant capacity value to the flash memory 34*d*, a vacant capacity value of the disk 34*c* can be detected even before completing the startup of the disk 34*c*.

The step S53 is a process for allowing determination as to truth/false of a vacant capacity value stored in the flash memory 34*d*. The controller 34*a* updates the number-of-times-of-writing data of the storage area 34*g* each time predetermined bytes of data have been recorded. However, the duplication process of a vacant capacity value to the storage area 34*a* and number-of-times-of-writing data to the storage area 34*h* is not performed unless duplication instructions of the steps S51 and S53 are provided. That is, where the memory card 34 is attached to such a camera that the process as in this embodiment is not performed, duplication process of a vacant capacity value and number-of-times-of-writing data is not made despite that an update is made to the number-of-times-of-writing data of the storage area 34*g*. Consequently, if there is a difference between the respective two of the number-of-times of writing stored in the storage areas 34*g* and 34*h*, the vacant capacity value stored in the storage area 34*i* represents an incorrect value. Accordingly, it is possible to determine truth/false of a vacant capacity value in the flash memory 34*d* according to the two of number-of-times of writing.

Subsequently, the process by the controller 34*a* will be explained with reference to FIG. 7 and FIG. 8. When a disk startup command (generated in the step S5) is given from the CPU 36, the controller 34*a* in step S61 determines "YES" and, in step S63, starts up a spindle motor of the disk system 34*b*. Then, the process returns to the step S61. When a number-of-times-of-writing reading command (generated in the step S7) is given from the CPU 36, the controller 34*a* in step S65 determines "YES" and, in step S67, reads two of number-of-times-of-writing data including a duplication out of the storage areas 34*g* and 34*h*. The read number-of-times-of-writing data is sent back, in step S69, to the CPU 36, and the process returns to the step S61.

Where a vacant-capacity-value reading command (generated in the step S11) is given from the CPU 36, the controller 34*a* in step S71 determines "YES" and, in step S73, reads a vacant capacity value out of storage area 34*i* of the flash memory 34*d*. The read vacant capacity value is sent back, in step S75, to the CPU 36, and the process after sending back returns to the step S61. Where a vacant-capacity-value reading command (generated in the step S15) is given from the CPU 36, controller 34*a* in step S77 determines "YES" and, in step S79, reads a vacant capacity value out of the management zone 34*e* of the disk 34*c*. The read vacant capacity value is sent back, in step S81, to the CPU 36, and the process after sending back returns to the step S61.

Where a data write command (generated in step S43) is given from the CPU 36, the controller 34*a* in step S83 determines "YES" and, in step S85, fetches data (predetermined bytes of compressed image data). Subsequently, in step S87 the fetched data is written to the data area 34*f* and, in step S89, the number-of-times of writing stored in the storage area 34*g* is incremented. The number-of-times of writing stored in the storage area 34*g* is incremented each time predetermined bytes of compressed image data is written to the data zone 34*f*. Ending the process of the step S89, the process returns to the step S61. Where a vacant-capacity-value update command (generated in the step S49) is given from the CPU 36, the controller 34*a* in step S91 determines "YES" and, in step S93, detects a vacant capacity in the data zone. Then, in step S95, the vacant capacity value is written to the management zone 34*e* and the process returns to the step S61.

Where a vacant-capacity-value duplication command (generated in step S51) from the CPU 36, the controller 34*a* in step S97 determines "YES" and, in step S99, duplicates the vacant capacity value written in the management zone 34*e* to the storage area 34*i* of the flash memory 34*d*. Ending the duplication process, the process returns to the step S61. Where a number-of-times-of-writing duplication command (generated in step S53) is given from the CPU 36, the controller 34a in step S101 determines "YES" and, in step S103, duplicates the number-of-times-of-writing data. That is, the number-of-times-of-writing data in the storage area 34g is duplicated to the storage area 34h. Ending the duplication, the process returns to the step S61.

Where any of the above commands is not given, the controller 34a proceeds to step S105 to determine whether the disk system 34b has been stabilized in operation, i.e., the rotation velocity of the spindle motor has become constant or not. Here, if the rotational velocity is varying, the process directly returns to the step S61 while, if the rotation velocity has been stabilized, a startup completion signal in step S107 is outputted to the CPU 36 and then the process returns to the step S61.

Data recording to the disk recording medium is impossible to perform before stabilizing the velocity of the spindle motor (disk). That is, where a disk is used as a recording medium, the time required for allowing recording after turning on the power is longer than the case using a semiconductor memory as a recording medium. Due to this, the operator, finding a best subject and turning on the power, is not allowed to immediately take a picture possibly missing a chance of shutter depressing.

Herein, it can be considered that shutter button operation be made effective before entering a recordable state so that a photographic image can be temporarily held on the semiconductor memory within the camera. This however makes part of the photographic image not to be recorded when the vacant capacity of the disk-recording medium is less than the capacity of the semiconductor memory. In conclusion, in order for assuring to record a photographic image, there is a need of detecting a vacant capacity of the disk-recording medium before activating the shutter button. Furthermore, the number of recordable frames cannot be determined unless a vacant capacity of the disk-recording medium is detected, requiring a time to indicate the number of recordable frames.

Consequently, in this embodiment, the vacant capacity value of the disk 34c is written to the flash memory 34d each time the compressed image data stored in the compressed image data 24a has been recorded. Upon turning the power on in the next time, the number of frames to be taken is limited based on the vacant capacity value read from the flash memory 34d. Specifically, the capacity of the compressed image area 24a is made invalid in a portion exceeding the vacant capacity of the disk 34c. Also, the number of recordable frames is calculated based upon the read vacant capacity value to indicate a calculated number of recordable frames on the display 48. This makes it possible to operate the shutter button 42 and allow the number of recordable frames to be recognized even before the disk 34c becomes a recordable state.

Meanwhile, where the memory card 34 of this embodiment is employed for another digital camera, the vacant capacity value written in the flash memory 34d is not necessarily correct. Consequently, a marker (number-of-times-of-writing data) is written in addition to a vacant capacity value to the flash memory 34d thereby determining, based on the marker, whether the vacant capacity value is correct or not. Here, if the vacant capacity value is incorrect, the shutter button 42 is activated for operation after the disk 34d has completely started up.

Incidentally, in this embodiment, although the disk system and the controller are provided within the memory card, the memory card satisfactorily includes at least a disk and flash memory. That is, the disk system and the controller may be provided in the digital camera.

Also, in this embodiment, although the image sensor of the CCD type is used, a CMOS-type image sensor may be used in place thereof.

Furthermore, this embodiment explained using the digital camera, the invention is applicable also to an audio recorder for recording the music data loaded by radio communication to a memory card through an internal memory. Also, the data to be downloaded may be image data or letter data besides music data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data recording apparatus having a slot for receiving therein a removable recording medium including a first semiconductor memory and a disk, to record data fetched by a fetcher and temporarily stored in a second semiconductor memory to the disk, comprising:

a vacant capacity value writer for writing a first vacant capacity value of said disk to said first semiconductor memory after the data have been recorded;

a vacant capacity value reader for reading the first vacant capacity value out of said first semiconductor memory when turning on a power; and a restricter for restricting an amount of data to be fetched by said fetcher on the basis of the first vacant capacity value read out by said vacant capacity value reader.

2. A data recording apparatus according to claim 1, wherein said restricter includes a comparator to compare a second vacant value of said second semiconductor memory with the first vacant capacity value, and an invalidator for making invalid said second semiconductor memory in a portion exceeding the first vacant capacity value depending upon a result of comparison by said comparator.

3. A data recording apparatus according to claim 1, further comprising:

a starter to start up said disk after turning on the power;

a determiner to determine whether or not said disk has stabilized in rotation velocity; and a recorder to record the data stored on said second semiconductor memory to said disk after the rotation velocity has stabilized.

4. A data recording apparatus according to claim 1, wherein said fetcher includes a picture-taker to take a picture of a subject and a compressor to compress image data taken by said picture-taker, said second semiconductor memory storing image data compressed by said compressor.

5. A data recording apparatus according to claim 4, further comprising:

a number-of-recordable-frames calculator to calculate the number of recordable frames on the basis of the first vacant capacity value read out by said vacant capacity value reader; and an indicator to indicate the number of recordable frames.

6. A data recording apparatus according to claim 1, further comprising:

a marker writer to write a predetermined marker to said first semiconductor memory after the data have been recorded;

a marker determiner to determine whether or not the predetermined marker exists on said first semiconductor memory when the power is turned on; and a disabler to disable said fetcher for a predetermined time depending upon a result of determination by said marker determiner.

7. A data recording apparatus according to claim 6, wherein the predetermined time is a time for which said disk comes into stabilization in rotation velocity.

8. A data recording apparatus having a slot for receiving therein a removable recording medium including a semiconductor memory and a disk, to record data fetched by a fetcher to said disk, comprising:

a vacant capacity value writer to write a vacant capacity value of said disk to said semiconductor memory after the data have been recorded;

a vacant capacity value reader to read the vacant capacity value out of said semiconductor memory when a power is turned on; and an outputter to output information related to the vacant capacity value read out by said reader.

9. A data recording apparatus according to claim 8, wherein said fetcher includes a picture-taker to take a picture of a subject, said outputter including a calculator to calculate the number of recordable frames on the basis of the vacant capacity value, and an indicator to indicate the number of recordable frames.

* * * * *